(12) United States Patent
Lessard et al.

(10) Patent No.: US 9,300,615 B2
(45) Date of Patent: Mar. 29, 2016

(54) METHODS AND DEVICES FOR GENERATING ACTION ITEM FROM EMAIL

(71) Applicant: RESEARCH IN MOTION LIMITED, Waterloo (CA)

(72) Inventors: Joshua Roland Lessard, Waterloo (CA); Peter Henry Mage, Cambridge (CA); Stephen Kwok Sun Wong, Thornhill (CA); Adrian Michael Logan, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 284 days.

(21) Appl. No.: 13/721,152

(22) Filed: Dec. 20, 2012

(65) Prior Publication Data

US 2014/0052797 A1 Feb. 20, 2014

Related U.S. Application Data

(60) Provisional application No. 61/684,970, filed on Aug. 20, 2012.

(51) Int. Cl.
*H04L 12/58* (2006.01)
*G06Q 10/10* (2012.01)

(52) U.S. Cl.
CPC .............. *H04L 51/18* (2013.01); *G06Q 10/107* (2013.01); *G06Q 10/109* (2013.01)

(58) Field of Classification Search
CPC ... G06Q 10/10; G06Q 10/107; G06Q 10/109; H04L 51/00; H04L 51/063; H04L 51/18; H04L 51/28; H04L 51/34

USPC .......................... 709/204, 206, 207; 715/752; 719/313–315, 317, 318
See application file for complete search history.

(56) References Cited

U.S. PATENT DOCUMENTS

| 5,923,848 | A   | * | 7/1999  | Goodhand et al. ............. 709/219 |
|-----------|-----|---|---------|--------------------------------------|
| 6,327,046 | B1  | * | 12/2001 | Miyamoto et al. ........... 358/1.15  |
| 7,584,253 | B2  |   | 9/2009  | Curbow et al.                        |
| 7,593,992 | B2  |   | 9/2009  | Wodtke et al.                        |
| 7,788,589 | B2  | * | 8/2010  | Frankel et al. ................ 715/752 |
| 8,032,553 | B2  |   | 10/2011 | Lippe et al.                         |
| 2006/0143613 | A1 |   | 6/2006  | Lippe et al.                         |
| 2007/0288577 | A1 | * | 12/2007 | Kronlund et al. ............. 709/206  |
| 2008/0033950 | A1 | * | 2/2008  | Lemay et al. ..................... 707/8 |
| 2009/0106365 | A1 | * | 4/2009  | Drory et al. ................... 709/206 |

(Continued)

OTHER PUBLICATIONS

Stacy Divin: "How to Use Flags in Outlook 2007" dated Feb. 14, 2011, XP055082159.

(Continued)

*Primary Examiner* — Brian J Gillis
*Assistant Examiner* — Gil H. Lee
(74) *Attorney, Agent, or Firm* — Rowand LLP

(57) ABSTRACT

Methods and devices for generating an action item based on an email message are described. In one embodiment, a processor-implemented method is described. The method includes: receiving an email message via a communication subsystem; determining that the received email message includes a follow up flag that indicates that an action is required regarding the email message; and in response to determining that the received email message includes a follow up flag that indicates that an action is required regarding the email message, creating an action item based on the received email message.

19 Claims, 3 Drawing Sheets

(56) References Cited

U.S. PATENT DOCUMENTS

2010/0037146 A1* 2/2010 Belsky et al. ............... 715/744
2011/0145822 A1   6/2011 Rowe et al.
2012/0129510 A1* 5/2012 Bradburn .................. 455/418
2013/0007139 A1* 1/2013 Bombacino et al. ......... 709/206
2013/0073634 A1* 3/2013 Saiu et al. .................. 709/206

OTHER PUBLICATIONS

Extended European Search Report dated Oct. 10, 2013.
Clear Context, User Guide, Tasks: Quickly Create to Do's, retrieved Oct. 4, 2012.
Heinz, About.com, "How to Create a Task from an Email in Gmail", retrieved Oct. 4, 2012.
Create Tasks and To-Do Items, retrieved Oct. 4, 2012.
Ideally Blue, "Automatically Creating Tasks from Email in Outlook", retrieved Oct. 4, 2012, published Mar. 16, (year unknown).
CIPO, CA Office Action relating to Application No. 2,834,005, dated Dec. 22, 2014.
Divin: "How to use Flags in Outlook 2007", Feb. 14, 2011m XP055082159.
EPO, EP Office Action relating to Application No. 12198432.2, dated Dec. 11, 2014.

* cited by examiner

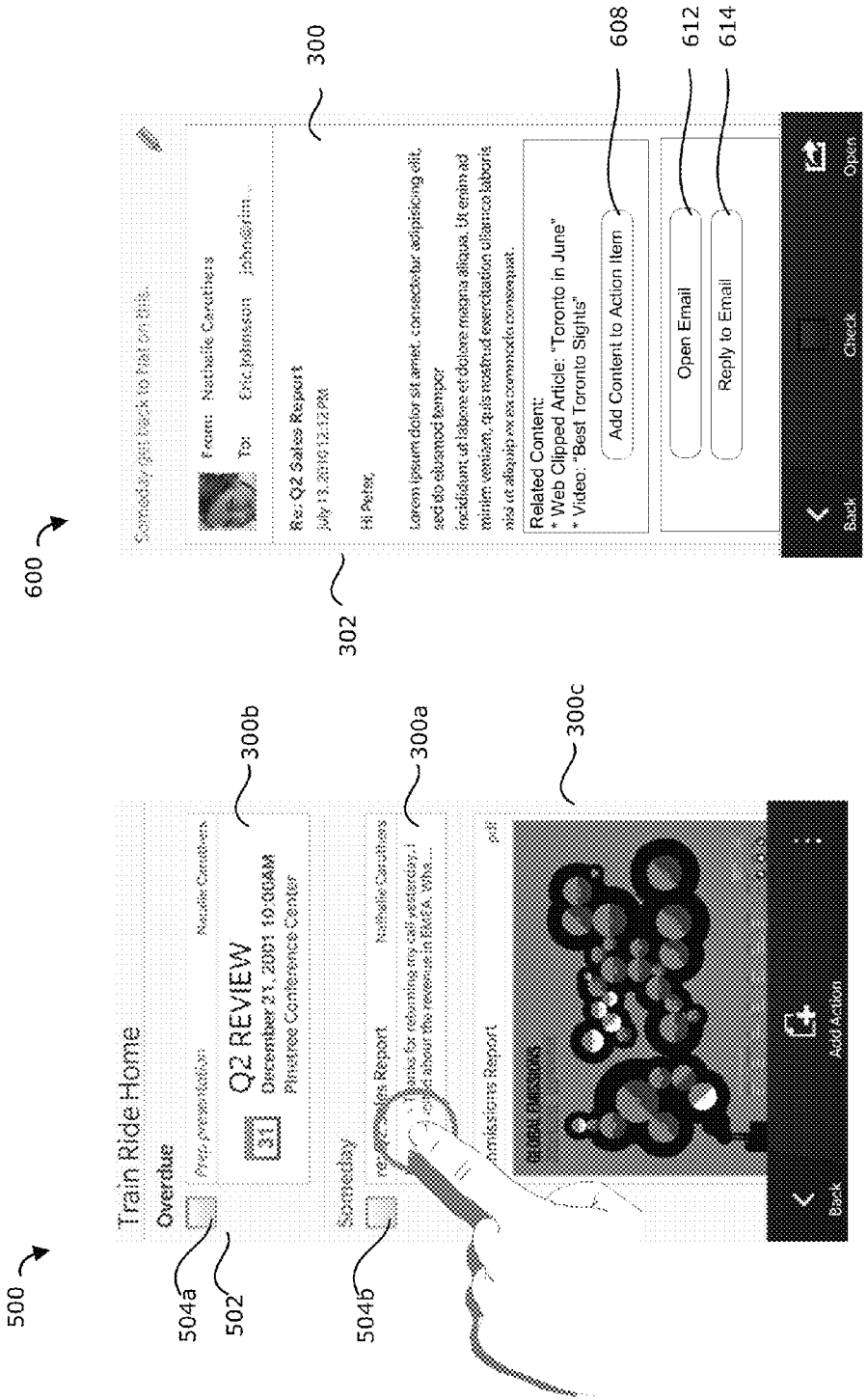

METHODS AND DEVICES FOR GENERATING ACTION ITEM FROM EMAIL

TECHNICAL FIELD

The present application relates to electronic messages and, more particularly, to methods and electronic devices for automatically generating an action item based on an electronic message, such as an email.

BACKGROUND

A personal information manager (PIM) is an application that functions as an organizer of information for a user. Personal information managers often organize addresses, personal notes and journal entries, tasks, reminders, archived email messages, etc.

Personal information managers often allow a user to create tasks. Tasks may, for example, be to-do items. That is, a task may be a record of an action that a user wishes to perform or complete. Tasks may be manually input into the personal information manager by a user. For example, a user may use a keyboard to manually compose the task. Some personal information managers may allow the task to be associated with a date and a reminder of the task to be generated based on the date. Tasks may be presented in a list (which may be referred to as a to-do list) which may include other tasks.

Personal information managers may provide a very limited set of management functions and may rely heavily on user input for task creation. There is a need for improved personal information managers.

BRIEF DESCRIPTION OF THE DRAWINGS

Reference will now be made, by way of example, to the accompanying drawings which show example embodiments of the present application, and in which:

FIG. 3 is an example display screen in accordance with example embodiments of the present disclosure; and FIG. 4 is an example display screen in accordance with example embodiments of the present disclosure.

Like reference numerals are used in the drawings to denote like elements and features.

DETAILED DESCRIPTION

In one example embodiment, the present application describes a processor-implemented method. The method includes: receiving an email message via a communication subsystem; determining that the received email message includes a follow up flag that indicates that an action is required regarding the email message; and in response to determining that the received email message includes a follow up flag that indicates that an action is required regarding the email message, creating an action item based on the received email message.

In another example embodiment, the present application describes an electronic device. The electronic device includes a processor, a communication subsystem coupled with the processor and a memory coupled with the processor. The memory includes processor-executable instructions which, when executed, cause the processor to receive an email message via the communication subsystem; determine that the received email message includes a follow up flag that indicates that an action is required regarding the email message; and in response to determining that the received email message includes a follow up flag that indicates that an action is required regarding the email message, create an action item based on the received email message.

In another example embodiment, the present application describes a computer readable storage medium comprising computer executable instructions, including instructions for: instructions for receiving an email message via the communication subsystem; instructions for determining that the received email message includes a follow up flag that indicates that an action is required regarding the email message; and instructions for creating an action item based on the received email message in response to determining that the received email message includes a follow up flag that indicates that an action is required regarding the email message.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

EXAMPLE ELECTRONIC DEVICE

Figure 1:
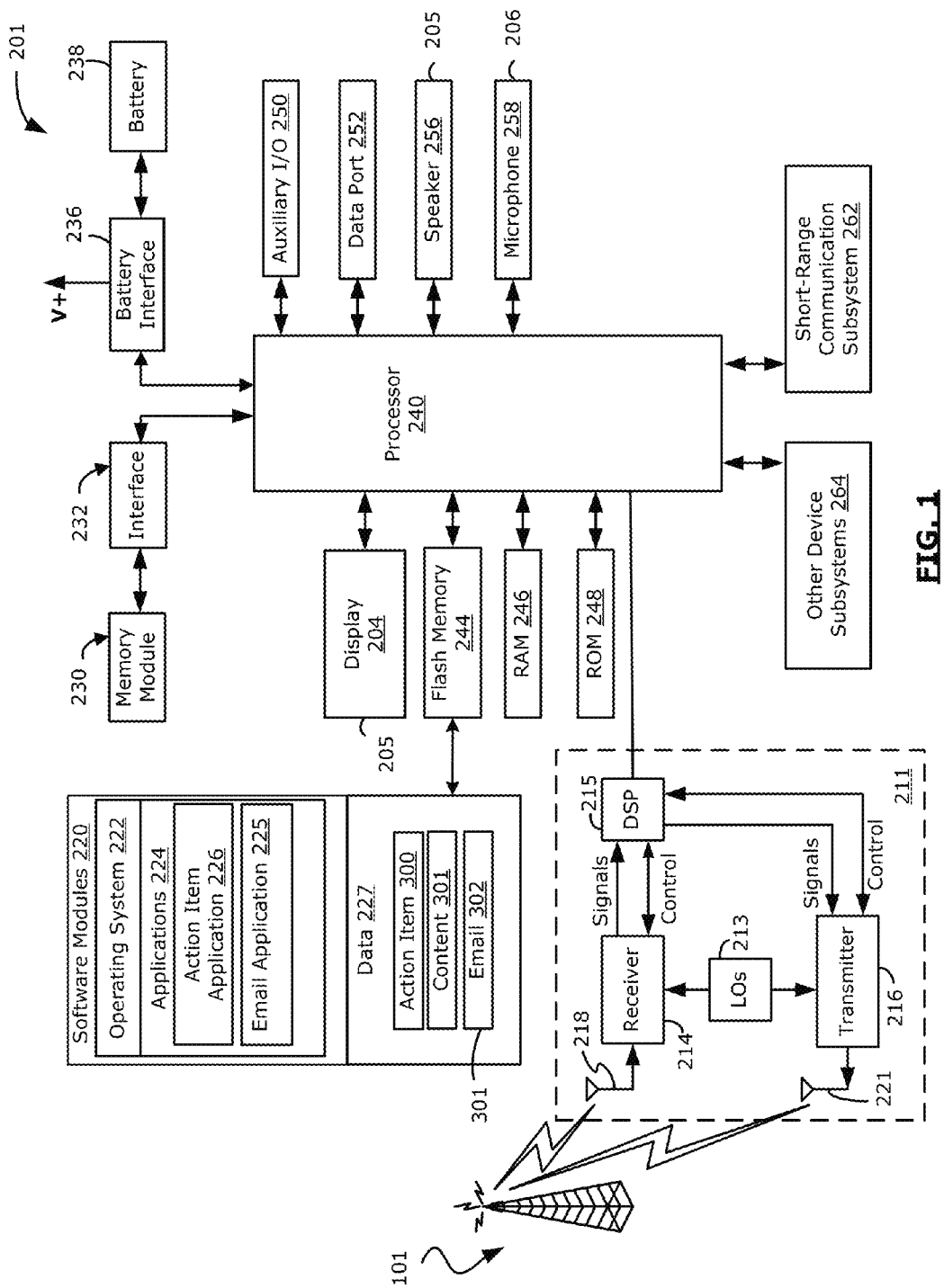
FIG. 1 is a block diagram illustrating an example electronic device in accordance with example embodiments of the present disclosure.

Reference is first made to FIG. 1 which illustrates an example electronic device 201. In the illustrated example embodiment, the electronic device 201 is a communication device, such as a mobile communication device. In at least some example embodiments, the electronic device 201 is a two-way communication device having data and voice communication capabilities, and the capability to communicate with other computer systems, for example, via the Internet. Depending on the functionality provided by the electronic device 201, in various example embodiments the electronic device 201 may be a multiple-mode communication device configured for data and voice communication, a mobile telephone such as a smart phone, a tablet computer such as a slate computer, a wearable computer such as a watch, a PDA (personal digital assistant), or a computer system.

A smartphone is a mobile phone which offers more advanced computing capabilities than a basic non-smartphone cellular phone. For example, a smartphone may have an ability to run third party applications which are stored on the smartphone.

A tablet computer (which may also be referred to as a tablet) is an electronic device 201 which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height which is seven inches (7") or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

In other example embodiments, the electronic device 201 may be of a type not specifically listed above.

The electronic device 201 includes a housing (not shown) which houses components of the electronic device 201. The internal components of the electronic device 201 are constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204, one or more speakers 256, or other output interfaces), a short-range communication subsystem 262, and other device subsystems generally designated as 264. Some of the subsystems shown in FIG. 1 perform communication-related functions, whereas other subsystems may provide "resident" or on-device functions.

The electronic device 201 may include a touch-sensitive display 204 which may be referred to as a touchscreen or a touchscreen display 204. The touchscreen display 204 may be constructed using a touch-sensitive input surface connected to an electronic controller. The touch-sensitive input surface overlays the touchscreen display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display 204 acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The electronic device 201 may include other wireless communication interfaces for communicating with other types of wireless networks, for example, a wireless network such as an orthogonal frequency division multiplexed (OFDM) network. The auxiliary I/O subsystems 250 may include a pointing or navigational tool (input device) such as a clickable trackball or scroll wheel or thumbwheel, or a vibrator for providing vibratory notifications in response to various events on the electronic device 201 such as receipt of an electronic message or incoming phone call, or for other purposes such as haptic feedback (touch feedback).

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the memory of the electronic device 201.

The data 227 may include one or more email messages 302. The email messages 302 are a form of content 301. The email messages 302 may, in at least some embodiments include received email messages (i.e. email messages received at the electronic device 201 but not composed on the electronic device) and sent email messages (i.e. email messages sent from an account associated with the electronic device 201). One or more of the email messages 302 may include an action required indicator, such as a follow up indicator. The action required indicator may, for example, be a flag that may be set for the email message to indicate that the email message requires an action. More particularly, the action required indicator may be a specific property or field associated with an email message that is configured to indicate that an email message requires an action to be completed. That is, the action required indicator may be a reserved field or property associated with the email message. This reserved field or property is separate and distinct from the message body or subject fields.

In at least some embodiments, the action required indicator may be set to identify the nature of the action required. For example, in at least some embodiments, the action required indicator may be set to: "follow-up", "review", "forward", "reply", "call", or other states indicating other actions not specifically recited herein. The action required indicator may be set by a message sender or a message recipient to indicate to a sender or a recipient that an action is required regarding the email message.

In at least some embodiments, the action required indicator of an email message 302 may include timing information. The timing information associated with the email message may specify a date (or period of time) when the action associated with the email message is to be completed or when a reminder should be generated based on the action item. By way of example, the timing information may include a due date associated with the email and/or a reminder date associated with an email (a date and/or time that will be used by the electronic device for triggering a reminder).

In at least some embodiments, the email message 302 may permit the action required indicator (such as the follow up indicator), or another indicator associated with the email message 302 (such an indicator may be referred to as a completion indicator) to be set to a completed state when the action is completed. In at least some embodiments, a graphical user interface may be provided by a messaging application (or another application) that allows a user to set the action required indicator to the completed state. For example, the email message may be displayed together with an interface element, such as a check box, which a user may activate to set the action required indicator to the completed state.

The data 227 may include one or more action items 300. An action item 300 may be a record of an action that a user wishes to be reminded of. That is, the action item 300 may be a record of a future action (i.e. an action that a user intends to perform in the future). More particularly, the action item 300 serves as a record for a user to remind the user that an action is required. Action items 300 may also be referred to as tasks.

In at least some embodiments, the action item 300 may include context information. Context information is information which is associated with the action item 300. More particularly, the context information may provide context for the action item 300. The context information may explain the circumstances which caused the creation of the action item and/or a requirement associated with the completion of the action item.

For example, in at least some embodiments, the action item 300 may specify timing information associated with the action item 300. Such timing information may specify a date or time period during which the action item 300 is to be completed. In some embodiments, the timing information may specify a date (or period of time) when the action item is to be completed or when a reminder should be generated based on the action item. The timing information may, however, be specified in a less-precise manner; for example, the timing information may be specified using imprecise terms such as "soon" or "someday". In at least some embodiments, software may associate each of these imprecise terms with a defined time period for the purposes of generating reminders. For example, "soon" may generate a reminder a week after creation of the action item while "someday" may generate a reminder a month after creation of the action item.

The timing information for an action item 300 may act as reminder condition for the action item 300. That is, reminders may be generated based on the timing information.

The action items 300 may also include content 301 and/or be associated with such content 301. For example, an action item 300 may, in at least some embodiments, link to one or more items of content 301 or may include one or more items of content 301 (e.g. the content may be embedding within the action item 300 and/or may be stored elsewhere, in which case the action item 300 may simply link to the content 301). The content 301 may, in at least some embodiments, be content 301 that is stored on the electronic device 201. Content 301 which is stored locally in memory of the electronic device 201 may be referred to as stored content. In some embodiments, the content 301 may be stored remotely (e.g. on a web server).

In some embodiments, and for some types of content 301, the action item 300 may not include the content 301 itself. Rather, the action item 300 may include a link or reference to the content 301. This link or reference allows the content to be accessed when accessing the action item 300.

The content 301 may, for example, include any one or combination of the following: text, a video (such as, for example, an MPEG video, WMV video, AVI video, etc.), an audio file (such as, for example, an MP3 audio file, a WAV audio file, a RealAudio audio file, etc.), an email message, a word processor file (such as a Microsoft Word™ file, etc.), a spreadsheet (such as a Microsoft Excel™ file), an electronic book (such as an e-book in an EPUB, MOBI, or other file format), a presentation (such as a Microsoft PowerPoint™ presentation), a Portable Document Format (PDF) document, an image file (such as a raster, vector or 3D graphic image including, for example, a JPEG file, TIFF file, etc.). Other types of content apart from those types listed above may also be stored in memory of the electronic device 201.

Content that is associated with an action item 300 may be content that may be useful in completing the action associated with the action item 300. For example, the content 301 may be something that a user may wish to review, access and/or consult in order to complete the action item 300.

In at least some embodiments, an action item 300 may be associated with multiple items of content 301. For example, the action item 300 may link to or include a first item of content 301 (such as text) and may also link to or include a second item of content 301 (such as a video).

As will be described in greater detail below, in at least some embodiments, the action item 300 may include or be associated with an email message 302. That is, the action item 300 may include content 301 or may link to content 301 that is an email message 302.

In at least some embodiments, action items 300 may have a completion indicator and/or progress indicator associated therewith. A completion indicator may be a flag that may be set to "complete" or "incomplete" to indicate whether the action associated with an action item 300 has been completed. In some embodiments, the completion indicator may have two possible values—a first value represents a complete state and a second value represents an incomplete state. A progress indicator may allow greater precision in describing a status of an action item 300. For example, a progress indicator may specify the degree to which the action has been completed (e.g. it may be specified as a percentage, such as 50%). In some embodiments, the progress indicator may allow a text-based status to be set to indicate the level of completion of the action associated with an action item 300. By way of example, the progress indicator may be set to "not started", "in progress," "waiting for feedback," or "done."

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may, for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes or is connectable to a power source, such as a battery 238 coupled to the electronic device 201 via a battery interface 236. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

A pre-determined set of applications that control basic device operations, including data and possibly voice communication applications will normally be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short-range communication subsystem 262, or other suitable device subsystems 264. The downloaded programs or code modules may be permanently installed, for example, written into the program memory (i.e. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or a web page download will be processed by the communication subsystem 211 and input to the processor 240 for further processing. For example, a downloaded web page may be further processed by a browser application or an email message may be processed by the email messaging application and output to the touchscreen display 204. A user of the electronic device 201 may also compose data items, such as email messages, for example, using the input devices, such as the touchscreen display 204. These composed items may be transmitted through the communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output is typically accomplished primarily through the speaker 256, the touchscreen display 204 may also be used to provide an indication of the identity of a calling party, duration of a voice call, or other voice call related information.

The processor 240 operates under stored program control and executes software modules 220 stored in memory such as persistent memory, for example, in the flash memory 244. As illustrated in FIG. 1, the software modules 220 include operating system software 222 and software applications 224, such as an email application 225 and/or an action item application 226.

The email application 225 is configured for providing functions associated with email messages 302. For example, the email application 225 may allow email messages 302 to be composed, displayed, forwarded, received, replied to, and/or sent. The email application 225 may provide other functions instead of or in addition to any one or more of these functions.

By way of example, as noted above, in at least some embodiments, email messages 302 may include an action required indicator. In at least some embodiments, the action item indicator may be set by a message sender. In at least some such embodiments, the email application 225 may be configured to allow a user to set and/or change the status of the action item indicator. For example, a received email message 302 may indicate that an action is required regarding the email message (e.g. it may indicate that a user should follow up). A graphical user interface provided by the email application 225 may then allow a user to change the state of the action item indicator; for example, to set it to a completed state. Thus, the email application 225 may provide functions for managing the action item indicator associated with an email message 302.

As will be described in greater detail below, in at least some embodiments, the action item application 226 is configured to create and manage action items 300. For example, in at least some embodiments, the action item application 226 may provide a user interface that allows action items 300 to be manually created. For example, the user interface may allow a user to input information that is to be associated with the action item 300.

As will be described below with reference to FIG. 2, in at least some embodiments, the action item application 226 is configured to automatically create an action item 300 based on a received email message 302 if that email message satisfies one or more predetermined criterion. For example, in at least some embodiments, the action item application 226 may automatically create an action item 300 based on a received email message 302 if an action item indicator associated with that received email message is set to a state which indicates that an action is required regarding the email message.

In some embodiments, a sender of an email message may have set the state of the action item indicator. For example, a sender of an email message may set the state of the action item indicator to a state that indicates that an action is required regarding the email message. Accordingly, when the email message is received it may already indicate that an action is required. The action item application 226 may determine whether the sender of a received email message has set the action item indicator to a state that indicates that an action is required regarding the email message and, if so may automatically create an action item 300 based on the received email message. Thus, in at least some embodiments, a sender of an email message received at the electronic device 201 may effectively create an action item on the electronic device 201.

As will be described in greater detail below with reference to FIGS. 3 and 4, in at least some embodiments, the action item application 226 may be configured to operate in an operating mode where it displays one or more display screens based on the action items 300 stored on the electronic device 201. For example, as will be described in greater detail with FIG. 3, in some embodiments, the electronic device 201 may display a display screen that lists a plurality of action items 300. This list (which may be referred to as a to-do list or a task list) may include both action items 300 that were automatically created based on an email message 302 (e.g. according to the method of FIG. 2) and may also include action items 300 created in other ways. For example, the list may also include action items 300 created manually.

As will be described in greater detail below with reference to FIG. 4, in some embodiments, the electronic device 201 may display a display screen that allows a user to view an action item 300 in greater detail. For example, the display screen may allow a user to view or access content 301 associated with the action item 300, such as an email message 302.

In at least some embodiments, the action item application 226 is configured to trigger reminders (e.g. to generate an audible, visual or vibratory alert) for action items; for example, using timing information associated with the action items 300.

In at least some embodiments, the action item application 226 or another application may include a sharing framework which allows action items 300 to be created from within other applications. The sharing framework may, for example, include an application programming interface (API) which allows other applications to access features or functions of the action item application 226. By way of example, the sharing framework may allow another application to create an action item 300 based on content 301 associated with the other application. For example, in at least some embodiments, the email application 225 may create an action item 300 based on an email message 302 received at the electronic device if certain predetermined criterion is satisfied.

In at least some example embodiments, the operating system 222 may perform some or all of the functions of the action item application 226 and/or the email application 225. In other example embodiments, the functions or a portion of the functions of the action item application 226 and/or the email application 225 may be performed by one or more other applications. Further, while the action item application 226 and the email application 225 have each been illustrated as a single block, these applications may include a plurality of software modules. In at least some example embodiments, these software modules may be divided among multiple applications.

The electronic device 201 may include a range of additional software applications 224, including for example, a notepad application, a word processing application, an image viewing and/or editing application, a calendar application, an address book application, a mapping application, or a media player application (such as a video player and/or an audio player), or any combination thereof. Each of the software applications 224 may include layout information defining the placement of particular fields and graphic elements (e.g. text fields, input fields, icons, etc.) in the user interface (i.e. the touchscreen display 204) according to the application. In at least some example embodiments, the software applications 224 may include pre-determined gesture information defining functionalities associated with the pre-determined gestures received via the touchscreen display 204. For example, a software application 224 may determine a finger swiping movement (i.e. a pre-determined gesture) on the touchscreen display 204 as a scrolling function.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Creating Action Items

The following discussion will refer to example methods for creating action items 300. Reference will be made to various example display screens to facilitate understanding of the example methods. The methods may, in at least some embodiments, be performed by the action item application 226 and/or the email application 225. More particularly, the action item application 226 and/or the email application 225 (and/or another application 224) may contain computer-readable instructions which, when executed, cause the processor 240 of the electronic device 201 to perform the methods described below. The computer-readable instructions may be configured to cause the processor to generate one or more screens having the features described below.

Figure 2:
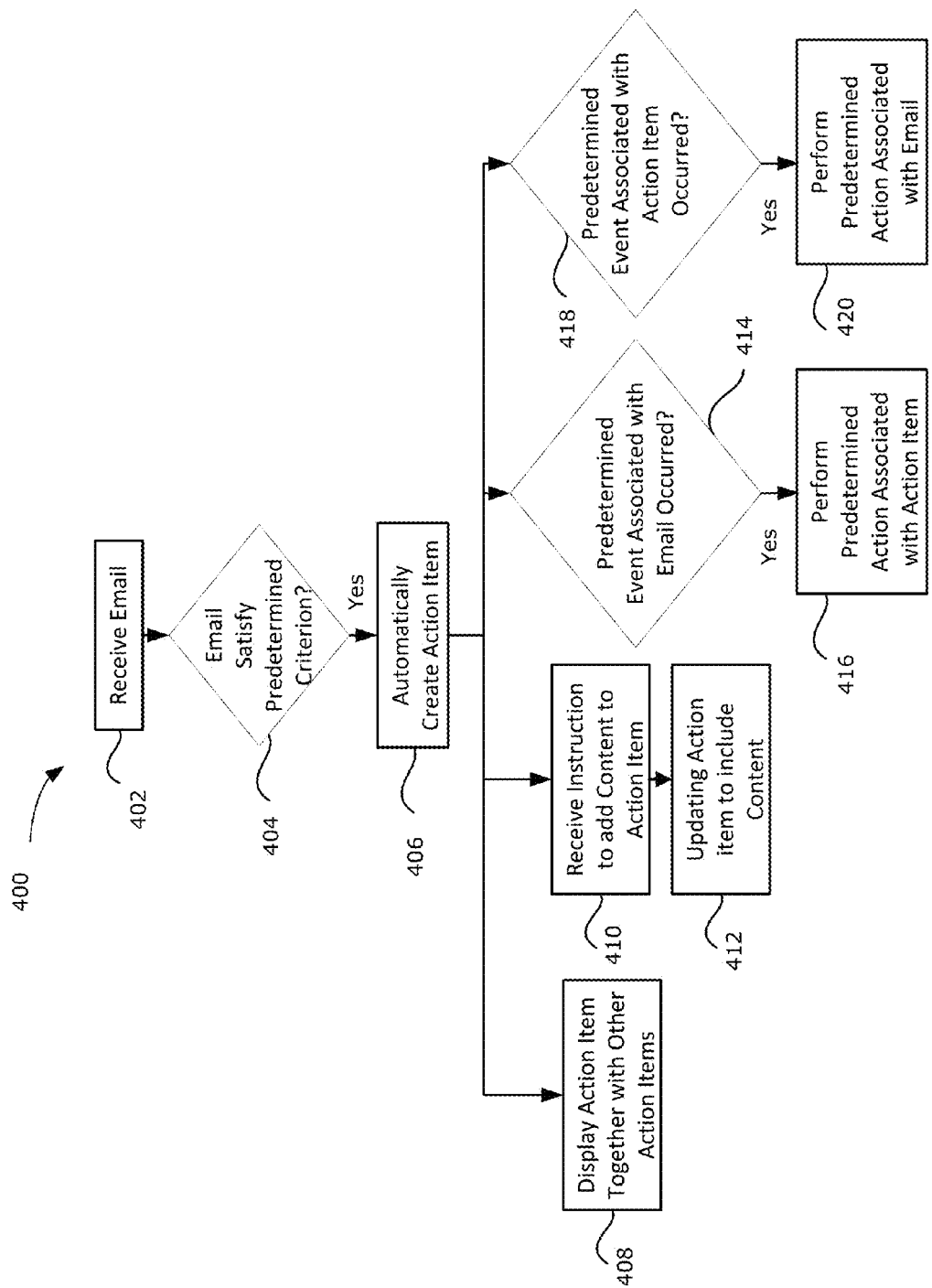
FIG. 2 illustrates a flowchart of an example method for creating an action item in accordance with example embodiments of the present disclosure.

Referring now to FIG. 2, an example method 400 for creating an action item 300 is illustrated. Features of the method 400 will be discussed with reference to the example screens of FIGS. 3 and 4.

At 402, an email message 302 is received at the electronic device 201. The email message 302 may, for example, be received via the wireless communication subsystem 211 or via another communication subsystem or interface. The email message 302 may be received by the email application 225. The email application 225 may be configured to manage the received email message 302. More particularly, the received email message 302 may be stored and/or displayed by the email application 225.

At 404, an application 224 associated with the electronic device 201 may determine whether the email message 302 satisfies one or more predetermined criterion. In at least some embodiments, the action item application 226 may perform 404. More particularly, the action item application 226 may examine the email message 302 and may determine whether the email message 302 satisfies the one or more predetermined criterion. In other embodiments, the email application 225 may perform 404. That is, the email application 225 may examine the email message and may determine whether the email message 302 satisfies the predetermined criterion. In other embodiments, other applications, such as third party applications may perform 404.

In at least some embodiments, the predetermined criterion requires that an action required indicator associated with the received email message indicates that an action is required regarding the email message. As noted in the discussion of FIG. 1, the action required indicator may, for example, be a flag that may be set for the email message to indicate that the email message requires an action. In at least some embodiments, the action required indicator may be set to identify the nature of the action required. For example, in at least some embodiments, the action required indicator may be set to: "follow-up", "review", "forward", "reply", "call", or other states indicating other actions not specifically recited herein. The action required indicator may be set by a message sender or a message recipient to indicate to a sender or a recipient that an action is required regarding the email message.

Accordingly, in at least some embodiments, the electronic device 201 may determine whether the received email message includes an action item indicator that indicates that an action is required regarding the email message. For example, the action required indicator may be a follow up flag, indicating that the user of the electronic device 201 is required to follow up regarding the email message.

In some embodiments, the action item indicator may be set by a message sender of the email message 302. In at least some such embodiments, the electronic device 201 may determine whether the received email message includes an action item indicator that was set by a sender of the email message and that indicates that an action is required regarding the email message.

If, at 404, the electronic device 201 determines that the email message 302 satisfies the predetermined criterion (e.g. if it determines that, based on the action item indicator, an action is required regarding the email message 302), then at 406, the electronic device creates an action item 300 based on the received email message 302.

The creation of the action item 300 may be performed by the email application 225, the action item application 226, or both. For example, in some embodiments, these applications 225, 226 (or other applications 224) may work cooperatively to create an action item 300. In some embodiments, the email application 225 may engage a sharing framework associated with the action item application 226, such as an API.

Thus, in at least some embodiments, in response to determining that the received email message satisfies the predetermined criterion an action item is created based on the received email message. As noted previously, in some embodiments, the predetermined criterion requires that an action required indicator associated with the email message be set to a state that indicates that an action is required regarding the email message. In such embodiments, when an action is required for an email message, an action item 300 is automatically created based on that email message.

When an action item is created at 406, a new record (which may be referred to as an action item record) may be created and stored in memory of the electronic device. This action item record may be stored in an action item database that is reserved for storing action items. The action item database may store action items irrespective of the manner by which they were created. For example, action items 300 that are created manually (e.g. via user input) may be stored together with action items that are created automatically (e.g. based on an email that requires an action).

The created action item may include content extracted from the email message and/or may include a link to the email message. As will be illustrated in FIG. 4, the link may allow a user to open the email message in the email application 225 when a user accesses the action item. The use of a link may reduce storage requirements since the content contained in the email is not stored separately with the email and the action item. In some embodiments, even when the content is included in the action item by way of a link, when the action item is opened and displayed the content may be displayed as embedded content. That is, when the action item is accessed, content from an email message that is linked with that action item may automatically be displayed.

When the action item 300 is created based on the email message 402, a completion indicator associated with the action item may automatically be set to a state that indicates that the action associated with the action item has not been completed.

In at least some embodiments, when the action item 300 is automatically created at 406, timing information associated with that action item 300 may automatically be generated. In some embodiments, such timing information may be generated based on the email message. For example, in at least some embodiments, the action required indicator of an email message 302 may include timing information. The timing information associated with the email message may specify a date (or period of time) when the action associated with the email message is to be completed or when a reminder should be generated based on the action item. By way of example, the timing information may include a due date associated with the email and/or a reminder date associated with an email (a date and/or time that will be used by the electronic device for triggering a reminder). In at least some such embodiments, timing information for the action item 300 may be generated based on the timing information specified by the action required indicator.

In some embodiments, the electronic device may parse the contents of the email message 302 to attempt to identify a word or phrase that may indicate timing information. For example, the electronic device may search for a phrase such as "get back to me by" and may look for timing information (such as a date) following the identified phrase. That timing information may be used to generate timing information for the action item 300.

In some embodiments, the electronic device may automatically generate timing information for the action item 300 based predetermined default timing information. For example, in one embodiment, the default timing information for an action item generated based on an email message may be one week.

As noted in the discussion of FIG. 1, in at least some embodiments, action items 300 may have a completion indicator and/or progress indicator associated therewith. In some such embodiments, at 406, the completion indicator for the action item 300 may be set to indicate that the action item has not been completed and/or to indicate that no progress has yet been made towards the completion of the action.

After the action item 300 has been created, one or more actions may be performed involving the created action item 300.

For example, the action item 300 may be displayed. For example, in some embodiments, at 408, a display screen 500 (FIG. 3) may display the action item 300 created at 406 based on the email message together with other action items, such as one or more manually created action items 300. An example of one such display screen 500 will be discussed in greater detail below with reference to FIG. 3.

In at least some embodiments, after an action item is created based on an email message, a user may be permitted to add other content to the action item.

For example, at 410, an instruction may be received at the electronic device 201 via an input interface 206 (FIG. 1) instructing the electronic device 201 to add content to the created action item 300 (i.e. to the action item created at 406).

Such an instruction may, for example, be received via a suitable interface element provided on a display screen, such as the display screen 600 of FIG. 4 (which will be discussed in greater detail below).

The instruction may specify the content 301 that is to be added to the action item 300. The content may be content that is stored on the electronic device 201 or content that is stored remotely. The content 301 may, for example, include any one or combination of the following: text, a video (such as, for example, an MPEG video, WMV video, AVI video, etc.), an audio file (such as, for example, an MP3 audio file, a WAV audio file, a RealAudio audio file, etc.), an email message, a word processor file (such as a Microsoft Word™ file, etc.), a spreadsheet (such as a Microsoft Excel™ file), an electronic book (such as an e-book in an EPUB, MOBI, or other file format), a presentation (such as a Microsoft PowerPoint™ presentation), a Portable Document Format (PDF) document, an image file (such as a raster, vector or 3D graphic image including, for example, a JPEG file, TIFF file, etc.). Other types of content apart from those types listed above may also be stored in memory of the electronic device 201.

In response to receiving the instruction to add the content 301 to the action item 300, the electronic device 201 adds the content to the action item 300 (at 412). For example, an action item 300 may, in at least some embodiments, be updated to link to the content 301 or may be updated to include the content 301 (e.g. the content may be embedding within the action item 300 and/or may be stored elsewhere, in which case the action item 300 may simply link to the content 301).

In at least some embodiments, when the action item 300 is created based on the email message, a bond is created between the action item 300 and the email message 302. An operation or action performed on the email message 302 may affect the action item 300 and/or an operation or action performed on the action item 300 may affect the email message 302. For example, content that is added to the action item (e.g. at 412) may be accessible when viewing the email message. For example, when viewing an email message associated with an action item to which additional content has been added, a link to the additional content may be provided.

For example, in at least some embodiments, after an action item 300 is created based on an email message, at 414, the electronic device 201 may monitor operations associated with the email message and may determine whether a predetermined event (which may be an operation of a predetermined type) associated with the email message 302 has occurred.

If the electronic device 201 determines that such a predetermined event has occurred, then at 416, the electronic device may perform a predetermined action associated with the action item.

For example, in some embodiments, at 414, the electronic device may monitor a completion indicator associated with the email message to determine whether the completion indicator has been set to a state that indicates that an action associated with the email message has been completed (this state may, for example, be set via user input received through the email application 225). If the electronic device 201 determines that the completion indicator has been set to the state that indicates that the action has been completed, then at 416, the electronic device 201 may automatically set a completion indicator associated with the action item 300 to a state that indicates that the action associated with the action item has been completed (this state may be referred to as a completed state). Thus, in at least some embodiments, a change to the completion indicator associated with an email message may cause a corresponding change to the completion indicator associated with an action item created based on that email message.

By way of further example, in some embodiments, at 414, the electronic device may determine whether the email message 302 has been replied to. That is, the electronic device 201 may determine whether the user has responded to the email message by sending an outgoing message to the sender of the received message. If the electronic device determines that a reply has been sent to the email message, then at 416, the electronic device may generate a prompt allowing a user to set a completion indicator associated with the action item 300 associated with that email message to a completed state. That is, the electronic device 201 may determine that, since the received email message that caused the action item to be created has been replied to, the completion indicator for that action item may need to be updated. In at least some embodiments, before updating the completion indicator, the electronic device 201 generates a prompt to allow a user to confirm that the completion indicator is to be updated.

In some embodiments, the electronic device 201 may monitor activity associated with the action item and may update the email message based on such activity. For example, at 418, the electronic device 201 may monitor to determine whether a predetermined event associated with the action item has occurred. If so, then at 420, the electronic device 201 may perform a predetermined action associated with the email message. For example, in some embodiments, at 418, the electronic device may determine whether a completion indicator associated with the action item has been set to a completed state. If the electronic device 201 determines that the completion indicator associated with the action item has been set to a completed state, then the electronic device 201 may, at 420, set a completion indicator associated with the email message that caused that action item to be created to a completed state. Thus, in at least some embodiments, a change to the completion indicator associated with an action item created based on an email message may cause a corresponding change to the completion indicator associated with that email message.

Referring now to FIG. 3, an example display screen 500 is illustrated. The example display screen 500 may be displayed at 408 of FIG. 2. The example display screen 500 includes an action item 300a created based on an email message. This action item 300a is displayed in a list 502 that also includes other action items 300b, 300c created in other ways. For example, these other action items 300b, 300c may be created manually (e.g. via direct user input). The action items 300a, 300b, 300c are displayed in an order that is not determined by the manner of creation. In the example illustrated, the list 502 is ordered such that action items 300a, 300b, 300c are ordered according to the urgency of those action items (i.e. according to timing information associated with the action items 300a, 300b, 300c).

The list 502 includes a completion-indicator interface element 504a, 504b for each displayed action item 300a, 300b, 300c (the completion-indicator interface element associated with the third action item 300c is obscured by a hand). The completion-indicator interface element 504a, 504b is a graphical user interface element that may be used for setting a completion indicator associated with the action item 300a, 300b, 300c.

The displayed action items 300a, 300b, 300c may be selectable. For example, a touchscreen display 204 may be used to allow a hand or another object to select an action item. Selection of an action item may cause an action item to be opened. More specifically, selection of an action item may cause a further display screen 600 (FIG. 4) to be displayed.

Referring now to FIG. 4, an example of the further display screen 600 is illustrated. The display screen 600 may be provided by the action item application 226. The display screen 600 is displayed when an action item 300 associated with an email message is opened. The display screen 600 displays the action item 300. More particularly, the display screen 600 includes the email message 302 (or a portion thereof).

As noted previously in the discussion of 410 and 412 of FIG. 2, in some embodiments, other content 301 (in addition to the email message 302) may be added to action item 300. In the example illustrated, the display screen identifies other content 301 that has been added to the action item 300. In the illustrated example the display screen identifies two items of content 301 that were previously added to complement the email message 302—an article clipped from the web entitled "Toronto in June" and a video entitled "Best Toronto sights".

The display screen 600 includes an interface element 608 that allows a user to add content 301 to the action item. The interface element 608 is selectable via an input interface 206 such as a touchscreen display 204. Activation of the interface element 608 may cause a further display screen (not shown) to be provided which allows a user to browse for content 301 that is to be added to the action item 300.

Other methods may be used to allow content to be added to an action item that was created based on an email message. For example, as noted previously, in at least some embodiments, the action item application 226 may include a sharing framework, such as an API that allows other applications 224 to access features of the action item application 226. The sharing framework may allow other applications that are accessing content to add that content to the action item 300. For example, when a web browser is active, a user may be permitted to clip an active web page directly to the action item 300. The web browser may activate the sharing framework to update the action item 300.

The display screen 600 also includes a selectable option 612 to open the email message associated with the action item 300. Activation of the selectable option 612 may cause the email message that caused the action item 300 to be created to be opened in an email application 225.

Similarly, in some embodiments, a display screen 600 may include a selectable option 614 to reply to the email message associated with the action item. That is, when the action item is accessed, a selectable option 614 to reply to the email message may also be provided. Activation of the selectable option to reply to the email message associated with the action item may cause a message composition user interface to be displayed within the email application 225. A recipient messaging address may be automatically populated with the address of the message that sent the email message 302 which is being replied to.

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various example embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A processor-implemented method comprising:
   receiving an email message via a communication subsystem;
   determining that the received email message includes a follow up flag that indicates that an action is required regarding the email message;
   in response to determining that the received email message includes a follow up flag that indicates that an action is required regarding the email message, automatically creating an action item based on the received email message;
   determining that a reply to the email message has been sent; and
   in response to determining that the reply to the email message has been sent, generating a prompt, at an output interface, to set a completion indicator associated with the action item to a completed state, wherein the output interface comprises a display or a speaker.

2. The method of claim 1, further comprising:
   displaying the created action item together with one or more manually created action items.

3. The method of claim 1, wherein the follow up flag is an action required indicator associated with the received email message that may be set to indicate that an action is required regarding the email message.

4. The method of claim 3, where the action required indicator is set by a sender of the received email message.

5. The method of claim 1, further comprising:
receiving an instruction to add content to the created action item; and
in response to receiving the instruction to add the content to the created action item, adding the content to the action item.

6. The method of claim 1, further comprising, after creating the action item:
determining that a predetermined event associated with the action item has occurred; and
in response to determining that the predetermined event associated with the action item has occurred, performing a predetermined action associated with the email message.

7. The method of claim 6, wherein determining that a predetermined event associated with the action item has occurred comprises determining that the completion indicator associated with the action item has been set to a state that indicates that an action associated with the action item has been completed, and wherein performing a predetermined action associated with the email message comprises setting a completion indicator associated with the email message to a completed state.

8. The method of claim 1, further comprising, after creating the action item:
when the action item is accessed, providing a selectable option to reply to the email message.

9. The method of claim 1, further comprising providing, in the email message, a link to content of the created action item.

10. The method of claim 1, wherein creating the action item includes configuring the action item to include a link to the email message and wherein the method further comprises displaying, in the created action item, the link to the email message.

11. An electronic device comprising:
a processor;
a communication subsystem coupled with the processor; and
a memory coupled with the processor, the memory comprising processor-executable instructions which, when executed, cause the processor to:
receive an email message via the communication subsystem;
determine that the received email message includes a follow up flag that indicates that an action is required regarding the email message;
in response to determining that the received email message includes a follow up flag that indicates that an action is required regarding the email message, automatically create an action item based on the received email message;
determine that a reply to the email message has been sent; and
in response to determining that the reply to the email message has been sent, generate a prompt, at an output interface, to set a completion indicator associated with the action item to a completed state, the output interface comprising a display or a speaker.

12. The electronic device of claim 11, wherein the processor-executable instructions further cause the processor to:
display the created action item together with one or more manually created action items.

13. The electronic device of claim 11, wherein the follow up flag is an action required indicator associated with the received email message that may be set to indicate that an action is required regarding the email message.

14. The electronic device of claim 13, where the action required indicator is set by a sender of the received email message.

15. The electronic device of claim 11, wherein the processor-executable instructions further cause the processor to:
receive an instruction to add content to the created action item; and
in response to receiving the instruction to add the content to the created action item, add the content to the action item.

16. The electronic device of claim 11, wherein the processor-executable instructions further cause the processor to provide, in the email message, a link to content of the created action item.

17. The electronic device of claim 11, creating the action item includes configuring the action item to include a link to the email message and wherein the processor-executable instructions further cause the processor to display, in the created action item, the link to the email message.

18. A non-transitory computer readable storage medium comprising computer executable instructions including:
instructions for receiving an email message via a communication subsystem;
instructions for determining that the received email message includes a follow up flag that indicates that an action is required regarding the email message;
instructions for automatically creating an action item based on the received email message in response to determining that the received email message includes a follow up flag that indicates that an action is required regarding the email message;
instructions for determining that a reply to the email message has been sent; and
instructions for, in response to determining that the reply to the email message has been sent, generating a prompt, at an output interface, to set a completion indicator associated with the action item to a completed state, the output interface comprising a display or a speaker.

19. The computer readable storage medium of claim 18, wherein creating the action item includes configuring the action item to include a link to the email message and wherein the computer executable instructions further include:
instructions for displaying, in the created action item, the link to the email message.

* * * * *